Patented Sept. 29, 1953

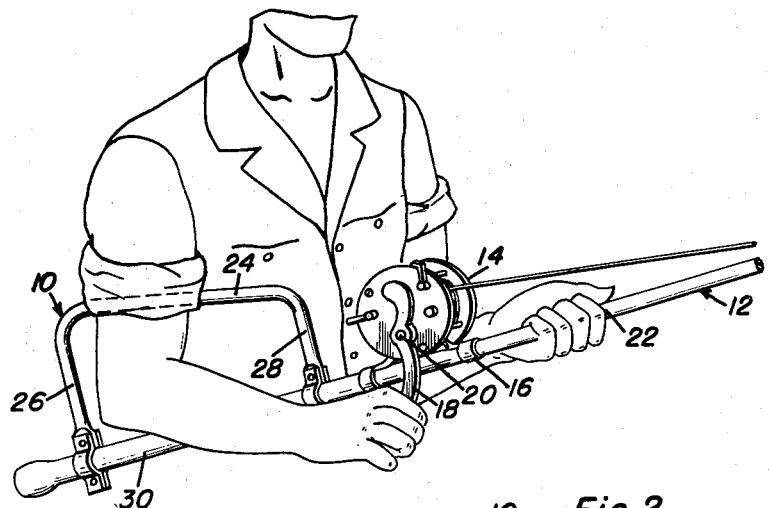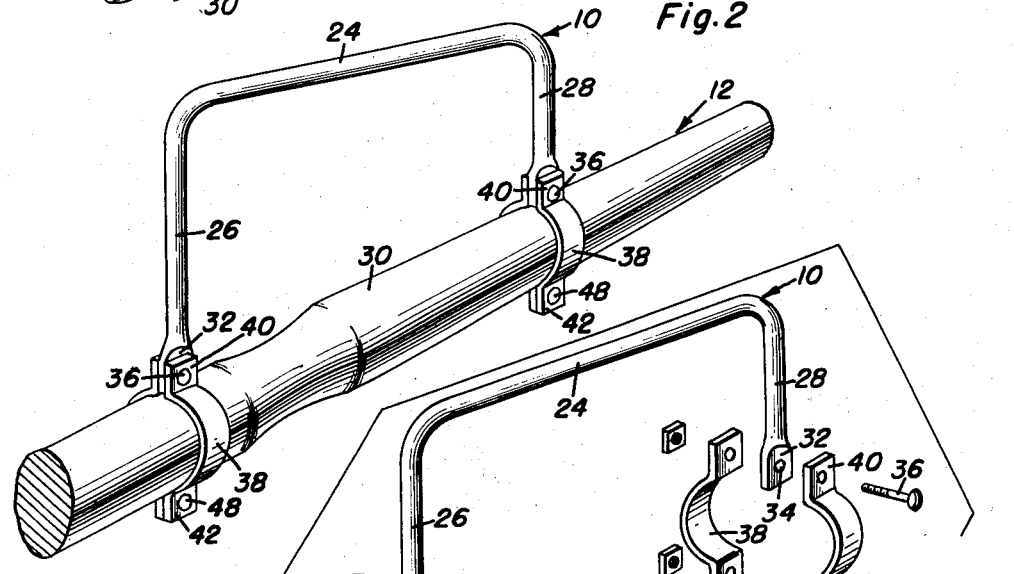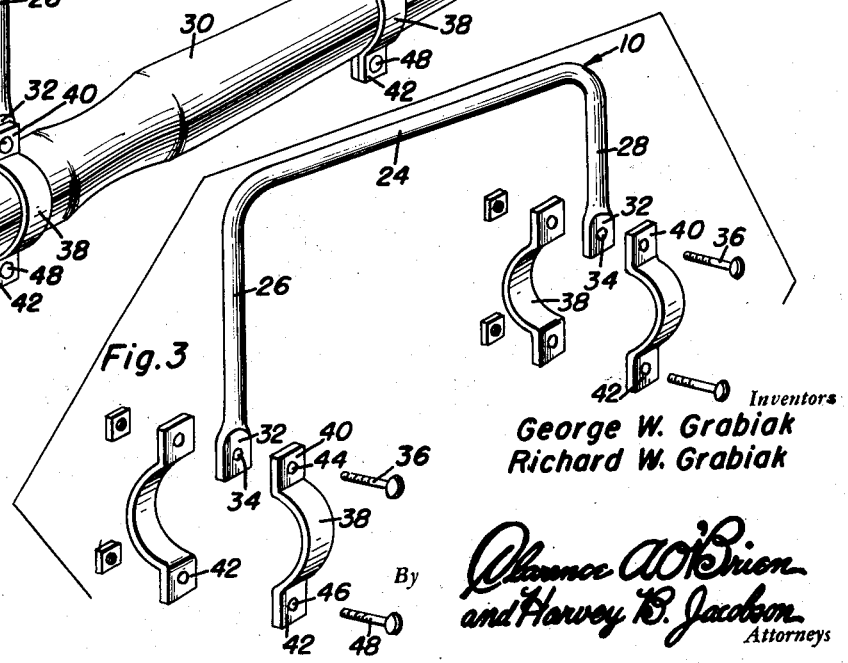

2,653,406

UNITED STATES PATENT OFFICE 2,653,406

FISHING ROD STABILIZER

George W. Grabiak and Richard W. Grabiak, Reading, Pa.

Application October 12, 1950, Serial No. 189,843

1 Claim. (Cl. 43—25)

This invention comprises novel and useful improvements in fishing apparatus, and more particularly pertains to an apparatus for stabilizing a fishing rod to prevent axial rotation thereof.

It is well known that a fishing rod will tend to turn about its axis, when the reel crank is actuated to reel-in a heavy fish, due to the forces exerted upon the crank, which forces have components thereof which tend to axially rotate the rod. It is an object of this invention to provide a device for preventing axial rotation of the rod, which device will not impede the manipulation of the reel or rod during the fishing operation.

Another important object of this invention is to provide a device which will prevent axial rotation of the rod due to actuation of the reel crank, which device is adapted to be disposed between the upper arm of the hand which actuates the reel crank, and the body of the fisherman, which device further serves as a fulcrum for the fishing rod, when the latter is vertically pivoted, as is common during the fishing operation.

These, together with various ancillary objects and features, are attained by this device, a preferred embodiment of which has been illustrated by way of example only in the accompanying drawings, wherein:

Figure 1 is a fragmentary perspective elevational view of a fishing rod having the stabilizer mounted thereon, and illustrating the use of the stabilizer;

Figure 2 is a fragmentary perspective elevational view of the fishing rod, with the stabilizer mounted thereon; and Figure 3 is a perspective exploded assembly view of the stabilizer.

Reference is now made more specifically to the accompanying drawings, wherein like numerals designate similar parts throughout the various views, and in which the numeral 10 generally denotes the stabilizer which is adapted to be detachably secured to the fishing rod 12, to prevent axial rotation thereof.

The fishing rod 12 has a reel 14 mounted thereon, as by a sleeve 16, the reel having a crank 18 extending laterally thereof, for rotation about the axis of the shaft 20, which shaft as is conventional, extends transversely of the fishing rod 12 and spaced therefrom. It will accordingly be appreciated that during the rotation of the crank 18, that the forces exerted thereon will not only tend to rotate the line winding reel, but will also tend to axially rotate the fishing rod 12, since the forces exerted upon the crank have components thereof disposed normal to the fishing rod, but spaced laterally therefrom, since, as is also conventional, the crank 18 is rotatable in a path disposed parallel to and spaced from the rod 12.

Although the tendency of the rod 12 to rotate about its axis is partially overcome by the fisherman gripping the rod as at 22, with the hand other than that which actuates the crank 18, this manner of stabilizing has not only been found insufficient, but also tiresome due to the muscular effort necessary to prevent rotation. In accordance with the objects of this invention there has been provided a stabilizing device 10 which includes a U-shaped member having a web portion 24 and first and second leg portions 26 and 28, respectively. The web and leg portions, which may be formed of round or polygonal stock, are adapted to be secured to the fishing rod 12, adjacent the handle forming end portion 30 thereof. For this purpose the leg portions 26 and 28 may be provided with flattened ends 32, having apertures 34 therein, for the reception of the clamp fasteners 36. The clamps may include a pair of complementary brackets 38 having oppositely extending ears 40 and 42 thereon, the ears 40 having apertures 44 therein for the reception of the clamp fasteners 36, the ears 42 having apertures 46 therein for the reception of similar fasteners 48. As will be appreciated from a consideration of Figures 1 and 2, the brackets 38 embrace the handle forming portion 30 of the rod 12, whereby the fishing rod stabilizer may be detachably, and non-rotatably secured to the fishing rod.

As it is customary to have the fishing rod 12 inclined slightly upwardly, it is intended that the second leg portion 28 of the stabilizer 10 be relatively shorter than the first leg portion 26, whereby the web portion 24 will be disposed substantially horizontally, and will consequently not impede oscillating motion of the upper arm of the fisherman, as the latter is moved during actuation of the crank 18.

As it is well known that during the "hauling in" of a fish, that the fishing rod 12 is vertically oscillated upwardly to draw the fish inward, and then as the rod is lowered the reel 14 is actuated to take up the slack in the line, it will be appreciated that the stabilizer 10 will not only serve to prevent axial rotation of the fishing rod 12, but, since the web portion 24 underlies the armpit of the fisherman, it will be appreciated that the stabilizer will further serve as a fulcrum about which the fishing rod may be vertically pivoted.

It will thus be appreciated that there has been provided a rod stabilizing device, which device is adapted to be disposed between the upper arm of the hand which actuates the reel crank, and the body of the fisherman, and which device not only prevents axial rotation of the rod, but also serves as a fulcrum therefor, during vertical pivotal movement thereof. It will further be appreciated that whenever conditions are such that the stabilizer 10 need not be utilized, it may be readily removed from the fishing rod, and consequently not impair the operation or storage thereof.

From the foregoing, it is thought that the operation and construction of the device will be readily understood, and further discussion is therefore believed to be unnecessary. However, since numerous modifications will readily occur to those skilled in the art after a consideration of the foregoing specification and accompanying drawings, it is not intended to limit the invention to that herein described, but all suitable modifications may be resorted to falling within the scope of the appended claim.

Having described the invention, what is claimed as new is:

In combination with a fishing rod having a reel, a fishing rod stabilizer extending upwardly from said rod behind the reel for interposing between the upper arm and body of the person operating the reel by the hand of said arm, said stabilizer comprising an inverted U-shaped member having relatively short and long front and rear legs with flattened terminals and a straight web connecting said legs, and clamps attaching the flattened terminals of said legs to said rod with the member coplanar with the rod and the short leg positioned between the reel and said long leg whereby said web inclines forwardly and downwardly towards said rod behind said reel to facilitate holding the rod in upwardly inclined position and vertical swinging of said rod with the web held under the arm pit of said arm.

GEORGE W. GRABIAK.
RICHARD W. GRABIAK.

References Cited in the file of this patent

UNITED STATES PATENTS

| Number | Name | Date |
|---|---|---|
| 183,975 | Rosee | Oct. 31, 1876 |
| 723,545 | Phillips | Mar. 24, 1903 |
| 826,928 | Fleck | July 24, 1906 |
| 2,085,654 | Harris | June 29, 1937 |
| 2,212,212 | Planitz | Aug. 20, 1940 |

FOREIGN PATENTS

| Number | Country | Date |
|---|---|---|
| 135,100 | Great Britain | Nov. 20, 1919 |